(12) United States Patent
Sakai et al.

(10) Patent No.: US 9,903,256 B2
(45) Date of Patent: Feb. 27, 2018

(54) BENT PIPE AND MANUFACTURING METHOD THEREOF

(71) Applicants: Yamashita Rubber Kabushiki Kaisha, Fujimino-shi, Saitama (JP); HONDA MOTOR CO., LTD., Tokyo (JP)

(72) Inventors: Makoto Sakai, Fujimino (JP); Haruyuki Yoshida, Fujimino (JP); Masato Kobayashi, Saitama (JP); Hisashi Sato, Saitama (JP); Hiroyuki Abe, Saitama (JP)

(73) Assignees: YAMASHITA RUBBER KABUSHIKI KAISHA, Fujimino-shi (JP); HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 14/800,797

(22) Filed: Jul. 16, 2015

(65) Prior Publication Data
US 2016/0131019 A1    May 12, 2016

(30) Foreign Application Priority Data

May 16, 2014 (JP) ................................. 2014-102891

(51) Int. Cl.
| | |
|---|---|
| *F16L 11/04* | (2006.01) |
| *F01P 7/14* | (2006.01) |
| *F16L 43/00* | (2006.01) |
| *F16L 11/12* | (2006.01) |

(52) U.S. Cl.
CPC .............. *F01P 7/14* (2013.01); *F16L 43/008* (2013.01); *F16L 11/121* (2013.01)

(58) Field of Classification Search
CPC ....................................................... F16L 9/00

USPC .......................................... 138/177, DIG. 11
See application file for complete search history.

(56) References Cited

U.S. PATENT DOCUMENTS

| | | | | |
|---|---|---|---|---|
| 3,623,511 A | * | 11/1971 | Levin ....................... | F16L 43/00 138/177 |
| 5,735,156 A | * | 4/1998 | Yoshitomi .............. | B21D 15/00 29/421.1 |
| 6,390,142 B1 | * | 5/2002 | Naito ....................... | F16L 39/00 138/177 |
| 8,191,583 B2 | * | 6/2012 | Mizumura ........... | B21D 26/033 138/177 |

(Continued)

FOREIGN PATENT DOCUMENTS

JP            5013912            6/2012

*Primary Examiner* — Patrick F Brinson
(74) *Attorney, Agent, or Firm* — Rankin, Hill & Clark LLP

(57) ABSTRACT

In a hose having a bent portion, a poor appearance part is prevented from being created in an inner round portion of the bent portion. A bent pipe has a bent portion located in an intermediate part in a longitudinal direction in which a cross section in a radial direction of a round of the bent portion is formed in a flat shape, and non-bent portions being continuous with the bent portion. The flat shape of the bent portion is a vertically long flat shape. With this configuration, when an unvulcanized hose is put on a mandrel and vulcanized, an inner round portion of the unvulcanized hose comes into tight contact with a bent portion of the mandrel and is not separated from the bent portion, so that the poor appearance part is hardly created in an inner round portion of the bent portion.

6 Claims, 16 Drawing Sheets

(56) References Cited

U.S. PATENT DOCUMENTS

| | | | | |
|---|---|---|---|---|
| 8,931,521 B2* | 1/2015 | Knebl | ................... | B29C 53/083 |
| | | | | 138/177 |
| 2007/0227610 A1* | 10/2007 | Sakazaki | ................ | F16L 11/04 |
| | | | | 138/177 |
| 2008/0092975 A1* | 4/2008 | Grimes | ................ | F16L 43/001 |
| | | | | 138/177 |
| 2009/0026761 A1* | 1/2009 | McMillan | ............... | F16L 43/00 |
| | | | | 285/179 |
| 2010/0122748 A1* | 5/2010 | Mizumura | ........... | B21D 26/033 |
| | | | | 138/177 |
| 2015/0059913 A1* | 3/2015 | Dorge | ................... | F01N 13/08 |
| | | | | 138/177 |

\* cited by examiner

BENT PIPE AND MANUFACTURING METHOD THEREOF

CROSS-REFERENCE TO RELATED APPLICATION AND TECHNICAL FIELD

The present application claims priority from Japanese Application No. 2014-102891, filed on May 16, 2014, the contents of which are hereby incorporated in full by reference.

The present invention relates to a bent pipe such as a radiator hose which has a bent portion in an intermediate portion in a longitudinal direction thereof and a manufacturing method of the bent pipe.

BACKGROUND ART

As a general model of a conventional bent pipe and a manufacturing method of the bent pipe, a rubber radiator hose which is formed in the shape of a bent pipe by a mandrel will be explained with reference to FIGS. 14 to 16. FIG. 14 is a plan view of a hose 110 having an intermediate portion bent approximately 90°. This hose 110 is provided with a bent portion 120 in a middle portion thereof and straight portions 130 and 132 connected to each side of the bent portion 120 in the longitudinal direction thereof.

In this example, the bent portion 120 and the straight portions 130, 132 are formed in a perfect circle shape in rotational cross section having an inner diameter D respectively as indicated by (a) and (b) in the drawing, and the bent portion 120 is formed in a curved round shape bent approximately 90°. In addition, a cross section indicated by (c) in the drawing corresponds to a cross section of a bent portion having a horizontally long elliptical shape (horizontally long flat shape), which is disclosed in a Patent Reference 1, discussed below.

Herein, various terminology used in this application will be explained. A circle having a curvature of a circular arc forming a round shape portion is a round circle C, a center of this round circle C is a round center CO, and a radius of the round circle C is a round radius CR. A numerical value of the round radius is a value of a round indicating a size of the round shape portion. For example, in the case where the round radius is 40 mm, a round of the round shape portion is 40 and is expressed as R40. It is noted that when the round radius CR is small, the curvature of the round shape portion is large, and the curvature of the round shape portion increases with decrease in the round radius CR.

Moreover, a center axis of the hose is HC, and a point on the center axis HC is a hose center HO. A cross section of the hose taken in an orthogonal direction of the center axis HC is a transverse cross section, in which a cross section of the bent portion taken in the radial direction of the round is a cross section in the radial direction of the round (the round radius direction).

Further, a condition of the hose shown from a direction orthogonal to the round circle C is a plan view. In this plan view, a side of the round center CO of the bent portion is an inside and an opposite side is an outside. An outer circumferential surface of the hole located between the inside and the outside is a lateral surface.

Furthermore, in the cross section in the radial direction of the round, the direction of the round radius is a vertical direction, and the direction orthogonal to the vertical direction is a horizontal direction. In a cross sectional shape in the radial direction of the round, a shape having different lengths in the vertical direction and in the horizontal direction passing the hose center HO is a flat shape. In particular, the shape of which the length in the horizontal direction is larger than that in the vertical direction is a horizontally long flat shape, while the shape of which the length in the vertical direction is larger than that in the horizontal direction is a vertically long flat shape.

Still further, a straight line passing the round center CO and the hose center HC is a center line L1 in the vertical direction, and a straight line which is orthogonal to the center line L1 in the vertical direction and passes the hose center HO is a center line L2 in the horizontal direction (see FIG. 2).

Like reference characters shall be commonly used in embodiments to referred to later.

In addition, in the description with reference to the drawings, the orientation such as upward, downward, left, right and the like shall be designated based on each direction such as upward, downward, left, right and the like in the drawings referred to in the description.

FIG. 15 shows a cross section of the bent portion 120 at the time of finishing a vulcanizing molding. The hose 110 is formed in the same bent shape as a mandrel 140 by putting an unvulcanized hose on the mandrel 140 which has the same bent shape as the hose 110, and vulcanizing it by heating it at a predetermined temperature.

At that time, a bent portion 142 of the mandrel 140 has substantially the same curvature as an inner circumferential portion of the bent portion 120. In the case where a round of an inner round portion 144 of the bent portion 142 is sharp to some extent, an inner round portion 124 of the bent portion 120 is separated from the inner round portion 144 of the mandrel 140 when the unvulcanized hose is put on the mandrel 140, and a space 180 is formed between the inner round portion 124 and the inner round portion 144.

Then, since the inner round portion 124 is compressed toward the center in the longitudinal direction as indicated by an arrow f1, the inner round portion 124 is subjected to buckling deformation toward an inside of the space 180 by compression force in the direction of arrow f1. Due to this buckling deformation, a poor appearance part 190 formed in an irregular shape, such as wrinkles or the like, is easily produced.

The reason why the space 180 is formed is because the inner round portion 124 is subjected to a restoring force in the direction of arrow f3 which is separated from the inner round portion 144 of the mandrel and directed to the round center CO, due to its own restoration elasticity by bending, and by this restoring force, the inner round portion 124 has a tendency to be separated apart from the inner round portion 144 of the mandrel. At that time, since the restoring force increases with a decrease in round of the inner round portion 124, the space 180 is easy to be formed.

In addition, an outer round portion 126 of the bent portion 120 is pulled in the directions indicated by arrows f2 and comes into tight contact with an outer round portion of the mandrel. Therefore, the poor appearance part 190 may not be formed, or only minimally formed, on the outside.

Further, there is another example in which, in order to suppress the creation of the poor appearance part 190 on the inside of the bent portion, the bent portion is formed in a horizontally long flat shape (see FIG. 14(c)) and a circumferential length of an inner circumference of the hose is gradually increased (see the Patent Reference 1) in the longitudinal direction of the hose.

RELATED ART REFERENCE

Patent Reference 1: Japanese Patent No. 5,013,912.

DISCLOSURE OF THE INVENTION

Problem to be Solved by the Invention

As disclosed in Patent Reference 1, when the bent portion is formed in a horizontally long flat shape and the circumferential length is gradually increased, the inner round portion 124 is pulled in the circumferential direction and comes into tight contact with the inner round portion 144 of the mandrel, so that the creation of wrinkles or the like can be suppressed to some extent. However, even if the bent portion is formed in such horizontally long flat shape, there may be cases where the creation of the wrinkles or the like cannot be suppressed depending upon the size of the round in the inner round portion 124.

FIG. 16 shows diagrams explaining the fundamentals of molding for forming the bent portion into a horizontally long flat shape, in which (A) is a diagram placing an inner circumferential configuration 170 of the bent portion 142 of the mandrel corresponding to an outer circumference of a cross section of the bent portion 142 (FIG. 15) of the mandrel taken in the radial direction of the round on a reference inner circumferential circle 160 corresponding to the inner circumference of the unvulcanized hose of a perfect circle. The inner circumferential configuration 170 is a horizontally long flat shape.

When putting the unvulcanized hose on the bent portion 142 of the mandrel, each of end portions 170a in the left and right direction of the inner circumferential configuration 170 of the bent portion expands the reference inner circumferential circle 160 in the left and right directions since the inner circumferential configuration 170 is of horizontally long flat shape. Therefore, left and right portions 160a of the reference inner circumferential circle 160 are pulled toward the end portions 170a in the left and right direction, and an upper portion 160b and a lower portion 160c are pressed against an upper portion 170b and a lower portion 170c of the inner circumferential configuration 170 of the bent portion.

FIG. 16(B) shows a fitted condition of the unvulcanized hose. The reference inner circumferential circle 160 of FIG. 16(A) is compressed as shown in a phantom line 160A in the direction in which the upper portion 160b and the lower portion 160c approach, so that it is formed into a horizontally long flat shape similar to the inner circumferential configuration 170 of the bent portion thereby to come into contact with the circumference of the inner circumferential configuration 170, and the upper portion 160b and the lower portion 160c of the reference inner circumferential circle 160 make tight contact with the upper portion 170b and the lower portion 170c of the inner circumferential configuration 170 of the bent portion (the reference inner circumferential circle 160A shown in the drawing is not placed on but slightly separated from the inner circumferential configuration 170 of the bent portion for the sake of explanation).

At that time, the upper portion 160b and the lower portion 160c are pulled toward the end portions 170a in the left and right directions and pressed firmly against the upper portion 170b and the lower portion 170c of the inner circumferential configuration 170 of the bent portion.

Since the lower portion 160c of the reference inner circumferential circle 160 is merely pulled toward the left and right portions 160a in the directions of arrows f4 and pressed against the lower portion 170c of the inner circumferential configuration 170 of the bent portion, it moves downwardly in the drawing as shown by arrow f3 when some other force acts, and is deformed into such a shape as shown in a phantom line 160B so as to be separated from the lower portion 170c of the inner circumferential configuration 170 of the bent portion, so that the space 180 is formed between the lower portion 160c and the lower portion 170c. This force in the direction of arrow f3 is the restoring force of the inner round portion 124 referred to above.

Then, when the inner round portion 144 of the mandrel is decreased in size so as to make the inner round portion 124 of the hose smaller than the predetermine limits, the restoring force of the inner round portion 124 of the hose is increased. This force acts in the direction of arrow f3 of FIG. 16(B) and prevails over the pulling force which presses the lower portion 160c against the lower portion 170c, so that the lower portion 160c is separated from the lower portion 170c.

Herein, the lower portion 170c of the inner circumferential configuration 170 of the bent portion corresponds to the inner round portion 144 of the bent portion 142 of the mandrel. Moreover, the lower portion 160c of the reference inner circumferential circle 160 corresponds to the inner round portion 124 of the bent portion 120 of the hose.

Accordingly, the inner round portion 124 of the hose is separated from the inner round portion 144 of the mandrel thereby to form the space 180, so that the poor appearance part 190 is created. In addition, even if the cross section of the bent portion of the hose is formed in a horizontally long flat shape, the space 180 is inevitably formed when the round of the inner round portion 124 is decreased smaller than the predetermined limits.

Hitherto, the round of the predetermined limits in which the space 180 is created is about twice as large as an inner diameter D. When the round is less than twice of the inner diameter D, the space 180 is formed, and as a result, there is a possibility that the poor appearance part 190 is created. Therefore, the round must be increased more than twice of the inner diameter D.

However, if the round of the bent portion is larger, an arrangement space must become larger. Accordingly, it has been required that the round is decreased in size in order to realize a compact arrangement. Moreover, such requirement of the decrease in size of the round is increasing. For example, in the case of a radiator hose of a motor vehicle, it is required in order to have a radiator and surrounding component members of an engine arranged compactly within an engine room without interference between the radiator and the surrounding component members to realize a compactification of a vehicle body. Therefore, it is desired to provide the bent pipe such as a hose and the like having a small round bent portion of less than twice of an inner diameter which has not been realized so far without impairing an external appearance, and a manufacturing method thereof.

Further, in the case where the circumferential length of the inner circumference is gradually increased in the longitudinal direction, as disclosed in the Patent Reference 1, it is conceivable that the unvulcanized hose comes into tight contact with the mandrel to be able to decrease the size of the round to some extent. However, when changing the circumferential length in such a way, as described above, the diameter of the unvulcanized hose is gradually increased in the longitudinal direction, so that the thickness varies in the longitudinal direction. Therefore, since a change of strength in the longitudinal direction is increased, the durability may be deteriorated. Accordingly, it is also desired to realize the decrease in size of the round without changing the circumferential length in the longitudinal direction.

It is an object of the resent invention to realize the above discussed improvements.

Means for Solving the Problem

In order to achieve the above described object, according to a first feature of the present application, there is provided a bent pipe comprising a bent portion (20) located in an intermediate part in a longitudinal direction in which a cross section in a radial direction of a round of the bent portion (20) is formed in a flat shape, and non-bent portions (30, 32) continuous with the bent portion (20), wherein the flat shape is a vertically long flat shape.

According to a second feature of the present application, in addition to the first feature, in a transverse cross section of the bent pipe, a circumferential length of the bent portion (20) is the same as each of circumferential lengths of the non-bent portions (30, 32).

According to a third feature of the present application, in addition to the second feature, transverse cross sections of the non-bent portions (30, 32) are formed in a perfect circle shape, and the pipe varies continuously in order of the non-bent portion (30), the bent portion (20) and the non-bent portion (32) in the longitudinal direction.

According to a fourth feature of the present application, in addition to any one of the first to third features, the bent portion (20) has a cross section of a vertically long elliptical shape or vertically long non-circular shape.

According to a fifth feature of the present application, in addition to any one of the first to fourth features, a cross sectional shape in the radial direction of the round of the bent portion (20) is asymmetric in a vertical direction.

According to a sixth feature of the present application, in addition to any one of the first to fifth features, the cross sectional shape in the radial direction of the round of the bent portion (20) is asymmetric in a horizontal direction.

According to a seventh feature of the present application, in addition to any one of the first to sixth features, each of the non-bent portions (30, 32) has a cross sectional part of perfect circle shape, and an inner round (24) of the bent portion (20) is less than twice of an inner diameter D of the cross sectional part of perfect circle shape.

According to an eighth feature of the present application, there is provided a manufacturing method of a bent pipe in which an unvulcanized pipe (50) is put on a mandrel (40) having a mandrel bent portion (42) in an intermediate part in a longitudinal direction and vulcanized so as to be molded in a bent pipe shape similar to a shape of the mandrel, wherein the mandrel bent portion (42) has a vertically long shape in cross section in the radial direction of a round thereof.

Effects of the Invention

According to the first feature of the present application, since the cross sectional shape in the radial direction of the round of the bent portion is the vertically long flat shape, creation of a poor appearance part, such as wrinkles or the like, is in an inside of the bent portion is minimized or eliminated, even if the round on the inside of the bent portion is smaller than predetermined limits.

According to the second feature of the present application, since in a transverse cross section of the bent pipe, the circumferential length of the bent portion is the same as each of the circumferential lengths of the non-bent portions, a thickness in the longitudinal direction is made uniform so as to be able to make strength in the longitudinal direction constant.

According to the third feature of the present application, the transverse cross sections of the non-bent portions are formed in a perfect circle shape, and the pipe varies continuously in order of the non-bent portion (30), the bent portion (20) and the non-bent portion (32) in the longitudinal direction, so that only the bent portion has the transverse cross section of vertically long flat shape and other portions have the cross section of perfect circle shape. Therefore, it is possible to prevent the creation of the poor appearance part, such as the wrinkles or the like.

According to the fourth feature of the present application, since the bent portion has a cross section of vertically long elliptical shape or vertically long non-circular shape, the degree of freedom in designing the cross sectional shape of the bent portion is increased.

According to the fifth feature of the present application, since an inside or outside of the bent portion is partially deformed so as to make the cross sectional shape asymmetric in the vertical direction, a clearance relative to surrounding component members may be provided, and the degree of freedom in designing the cross sectional shape of the bent portion is increased.

According to the sixth feature of the present application, since a lateral surface of the bent portion is deformed so as to make the cross sectional shape asymmetric in the horizontal direction, the clearance relative to surrounding component members may be provided, and the degree of freedom in designing the cross sectional shape of the bent portion is increased.

According to the seventh feature of the present application, even if the inner round of the bent portion is less than twice the inner diameter D of the non-bent portion of the bent pipe, the creation of the poor appearance part on the inside of the bent portion can be prevented. Therefore, it is possible to realize the small round of less than twice of the non-bent portion of the bent pipe, which has not been realized so far.

According to the eighth feature of the present application, the mandrel bent portion has a vertically long shape in cross section in the radial direction of the round thereof. Therefore, when the unvulcanized pipe is put on the mandrel and is bent, it is possible to bend the unvulcanized pipe without buckling deformation. Thus, the hose having the smaller round on the inside of the bent portion than the predetermined limits can be molded while suppressing the creation of the poor appearance part on the inside of the bent portion.

BEST MODE FOR CARRYING OUT THE INVENTION

Hereinafter, an embodiment of the present invention embodied in a radiator hose for a motor vehicle will be explained with reference to the drawings.

Figure 1:
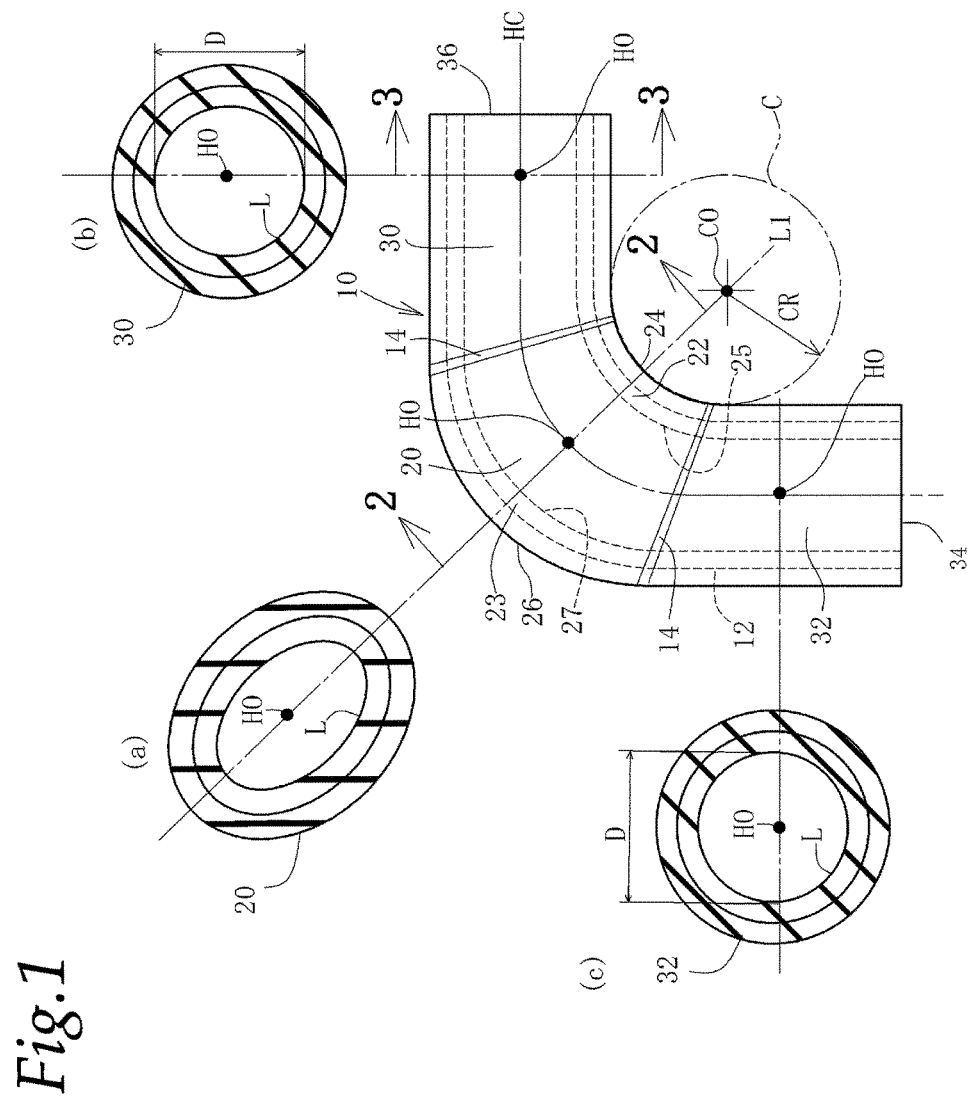
FIG. 1 is a plan view of a hose (along with rotational cross sections)
Figure 2:
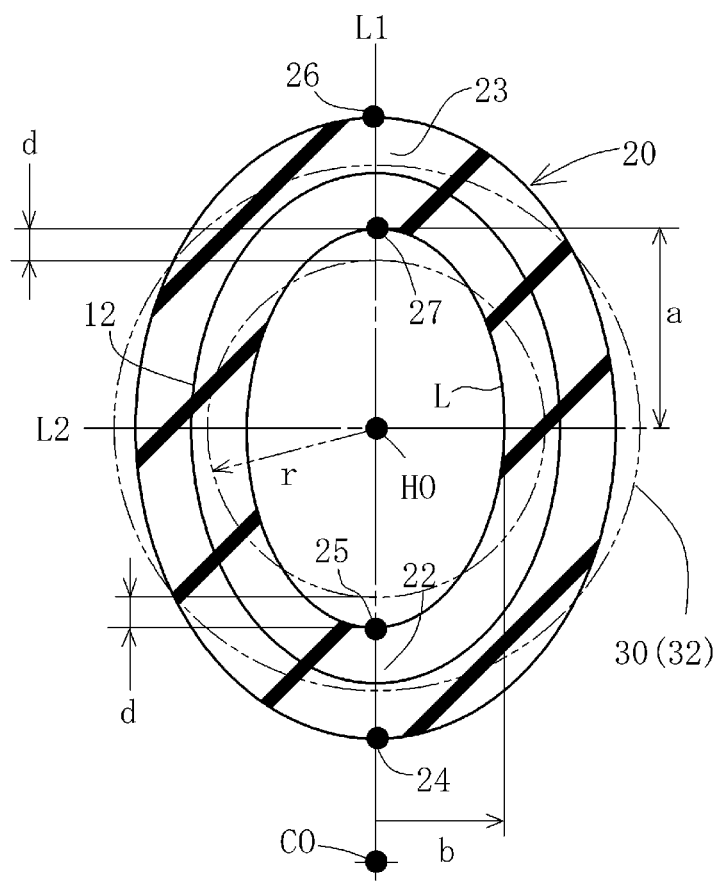
FIG. 2 is a cross-sectional view taken on line 2-2 of FIG. 1.
Figure 3:
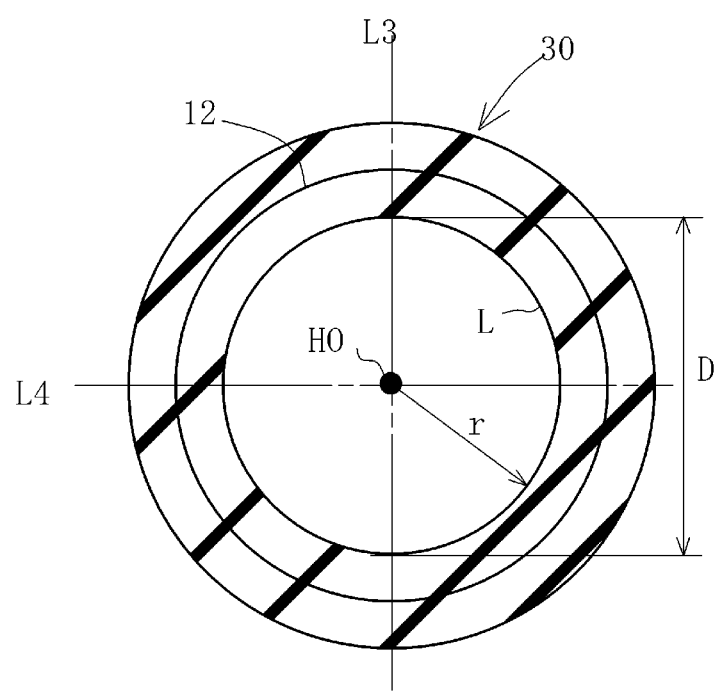
FIG. 3 is a cross sectional view taken on line 3-3 of FIG. 1.

FIGS. 1 through 9 are views in accordance with the first embodiment, in which FIG. 1 is a plan view of a hose 10, FIG. 2 is a cross sectional view taken on line 2-2 of FIG. 1, and FIG. 3 is a cross sectional view taken on line 3-3 of FIG. 1.

In these drawings, the hose 10 is a rubber hose which is vulcanized and molded of a proper rubber material, and has a bent portion 20 bent approximately 90° in an intermediate portion thereof. A first straight portion 30 and a second straight portion 32 of a straight pipe shape forming non-bent portions are formed on both sides in the longitudinal direction of the bent portion 20. For convenience' sake, an end in the longitudinal direction on the side of the second straight portion 32 is designated as a starting end 34, and an end in the longitudinal direction on the first straight portion 30 is designated as a terminal end 36.

The hose 10 is integrally molded with a reinforcing fabric 12 in an interior of a thickness thereof (see FIGS. 2 and 3). The reinforcing fabric 12 is provided continuously over the whole length of the hose 10. The reinforcing fabric 12 may be omitted while remaining within the scope of the instant disclosure.

The hose 10 is formed continuously from the first straight portion 30 through the bent portion 20 to the second straight portion 32. Shapes in transverse cross section of the first straight portion 30, the bent portion 20 and the second straight portion 32 are indicated as (a), (b) and (c) in the drawing. The shapes in transverse cross section vary at each position of round stops 14.

A bent portion inside 22 and a bent portion outside 23 of the bent portion 20 are of round shape, respectively. An inner round portion 24 in an outer circumferential surface of the bent portion inside 22 is of circular arc of a round circle C, and a round radius of this round circle C is CR. Namely, the round of the inner round portion 24 is CR (a numerical value). Herein, the round is set to a value less than twice of an inner diameter D. For example, D=30 mm, CR=40 mm, and the round of the inner round portion 24 is R40. This round corresponds to about 4/3D, so that it is remarkably small in the hose of this size. In addition, an inner circumferential round 25 of the bent portion inside 22 is larger by an amount equal to its thickness.

An outer round portion 26 which is a round portion of an outer circumference of the bent portion outside 23 of the bent portion 20 is larger than the round of the inner round portion 24 substantially by an amount equal to an outer diameter (long diameter) in a vertically long direction of the bent portion. An inner circumferential round 27 of the bent portion outside 23 is smaller than the outer round portion 26 by an amount equal to its thickness.

A cross section (transverse cross section) in the radial direction of the round of the bent portion 20, as shown in FIG. 2, is formed in a vertically long elliptical shape in the radial direction of the round circle C. An elliptical shape on an inner circumferential side of the vertically long elliptical shape is a vertically long flat shape which projects in the vertical direction and has a long radius a in the vertical direction and a short radius b in the horizontal direction.

The long radius a extends in a superposed relation with a vertically extending center line L1 which connects a hose center HO and a round center CO. The short radius b extends in a superposed relation with a horizontally extending center line L2 which intersects at right angles with the vertically extending center line L1 and passes through the hose center HO. Letting the inner diameter of the first straight portion 30 (the second straight portion 32) be D, and the radius be r, a>r>b. Letting an amount of vertical projection be d, d=a−r.

In addition, since the thickness is constant, an outer circumferential side of the vertically elliptical shape has a vertically long elliptical shape similar to the inner circumferential side thereof.

A cross section of the first straight portion 30 is of perfect circular shape as shown in FIG. 3, and an inner diameter thereof is D. The second straight portion 32 on an opposite side of the bent portion 20 has the same inner diameter as the first straight portion 30. Namely, the hose 10 is of perfect circular cross section of the same inner diameter over the whole length thereof excluding the bent portion 20.

Straight lines L3 and L4 are two orthogonal axes passing through the center HO and each corresponding to L1 and L2 of FIG. 2. L3 is a vertically extending center line in the upward and downward direction of the drawing, and the L4 is a horizontally extending center line in the left and right direction of the drawing.

A circumferential length of an inner circumference of each of the bent portion 20, the first straight portion 30 and the second straight portion 32 is L, and it is the same including portions of the round stops 14. Namely, each of the inner circumferential lengths of the cross section (FIG. 2) in the radial direction of the round (hereinafter, to be referred also to the round radius direction) of the bent portion 20 and the transverse cross section (FIG. 3) of the first straight portion 30 (the second straight portion 32) is the inner circumferential length L. Herein, although in FIGS. 2 and 3, the reference character L points to an inner circumferential surface of the hose, L references the circumferential length. The expression with respect to the circumferential length L in cross section is the same in other drawings. In addition, in this embodiment, since the thickness of the hose 10 is substantially constant over its whole length, the circumferential length of each of the portions is the same in outer circumferential length.

Further, although the shape in transverse cross section of the hose 10 varies at the round stops 14 from a perfect circle to an ellipse or an ellipse to a perfect circle, this variation in cross sectional shape is made gradually in such a manner that the bent portion 20 is smoothly connected to each of the first straight portion 30 and the second straight portion 32 located on both side thereof. The circumferential length L is also kept identical in this variation part. Accordingly, a passage cross sectional area of the hose 10 is constant over the whole length thereof.

Next, a manufacturing method of this hose 10 will be explained.

Figure 4:
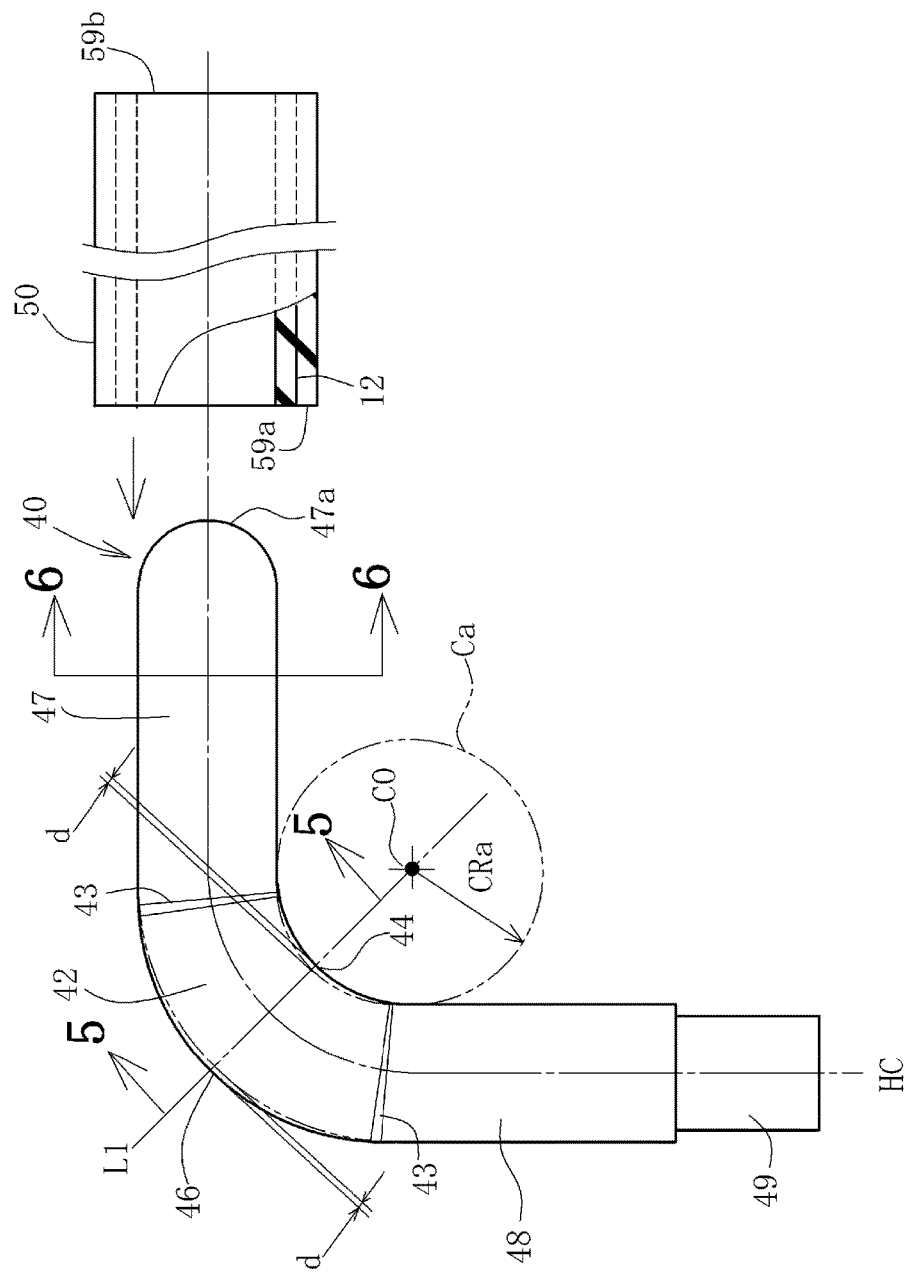
FIG. 4 is a view indicating a manufacturing method of the hose.

As shown in FIG. 4, an unvulcanized hose 50 (corresponding to an unvulcanized pipe in this application) of perfect circular cross section which is unvulcanized is put on a mandrel 40 of bent pipe shape, and then the unvulcanized hose 50 is heated at a predetermined temperature in a condition where the unvulcanized hose 50 is bent along the bent shape of the mandrel 40, so that the unvulcanized hose 50 is vulcanized and molded into the hose of bent pipe shape which is fixed in the same shape as the mandrel 40.

The mandrel 40 is made of a metallic round bar and formed with a mandrel bent portion 42 of which an intermediate portion in the longitudinal direction is bent approximately 90°. Reference characters 43 designate round stops. The mandrel 40 varies in cross section in order of a perfect circle, a vertically long ellipse and a perfect circle in the longitudinal direction, with the round stops 43 serving as a boundaries.

A mandrel inner round portion 44 of the mandrel bent portion 42 has a round shape substantially the same as the inner circumferential round 25 (FIG. 1) of the bent portion inside 22 of the bent portion 20 of the hose 10. Moreover, a mandrel outer round portion 46 of the mandrel bent portion 42 also has a round shape substantially the same as the inner circumferential round 27 (FIG. 1) of the bent portion outside 23 of the bent portion 20 of the hose 10.

Since the mandrel 40 molds the hose 10 in a condition where the hose 10 is fitted coaxially to the mandrel 40 from outside, as described below, like elements of the mandrel 40 are given like reference characters of the hose 10, such as HC, HO, a, b, r, CO, L1, L2, L3 and L4. In addition, since a round circle of the mandrel corresponds to the inner circumferential round 25, it is designated Ca in distinction from the round circle of the inner round portion 24, and a radius of the round of the round circle of the mandrel is designated CRa.

On one end side in the longitudinal direction of the mandrel bent portion 42 there is formed a mandrel first straight portion 47 an end 47a of which is formed in a curved surface shape in order to make it easy to insert the unvulcanized hose 50. A mandrel second straight portion 48 is formed on the opposite side of the mandrel first straight portion 47. A mounting portion 49 is provided on an end portion of the mandrel second straight portion 48 in a projecting fashion. When the mounting portion 49 is mounted on a frame member (not shown), the mandrel 40 is carried on the frame member.

Figure 5:
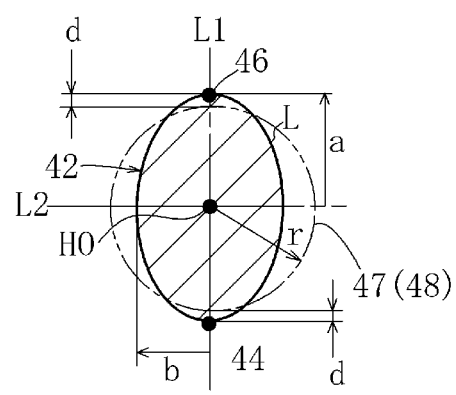
FIG. 5 is a cross sectional view taken on line 5-5 of FIG. 4.

As shown in FIG. 5, a transverse cross section of the mandrel bent portion 42 is of vertically long elliptical shape, and an outer circumference of the mandrel bent portion 42 corresponds with the inner circumference of the bent portion 20. Namely, a circumferential length of a cross section in the round radius direction of the mandrel bent portion 42 is L.

The mandrel inner round portion 44 and the mandrel outer round portion 46 protrude inwardly and outwardly as much as d with respect to a concentric circle of a radius r, respectively. The circle of the radius r is a circle of an outer circumference in transverse cross section of each of the mandrel first straight portion 47 and the mandrel second straight portion 48. This radius r is also an inner diameter of each of the first straight portion 30 and the second straight portion 32.

Figure 6:
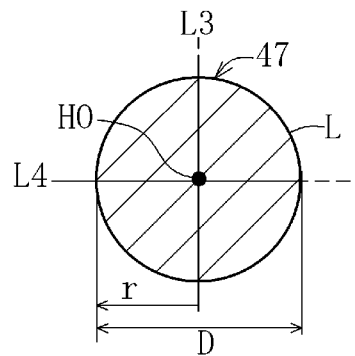
FIG. 6 is a cross sectional view taken on line 6-6 of FIG. 4.

The cross sections of the mandrel first straight portion 47 and the mandrel second straight portion 48 are formed in the shape of a perfect circle, respectively, as shown in FIG. 6, of which an outer circumference corresponds to an inner circumference of each of the first straight portion 30 and the second straight portion 32. Namely, the outer diameter is D, and the radius is r. In addition, although FIG. 6 shows a cross section of the mandrel first straight portion 47, the mandrel second straight portion 48 also has the same cross section.

Moreover, circumferential lengths of the outer circumferences of each of the mandrel bent portion 42, the mandrel first straight portion 47 and the mandrel second straight portion 48 are identical with each other and correspond with the circumferential length L of the inner circumference of the hose 10.

Figure 7:
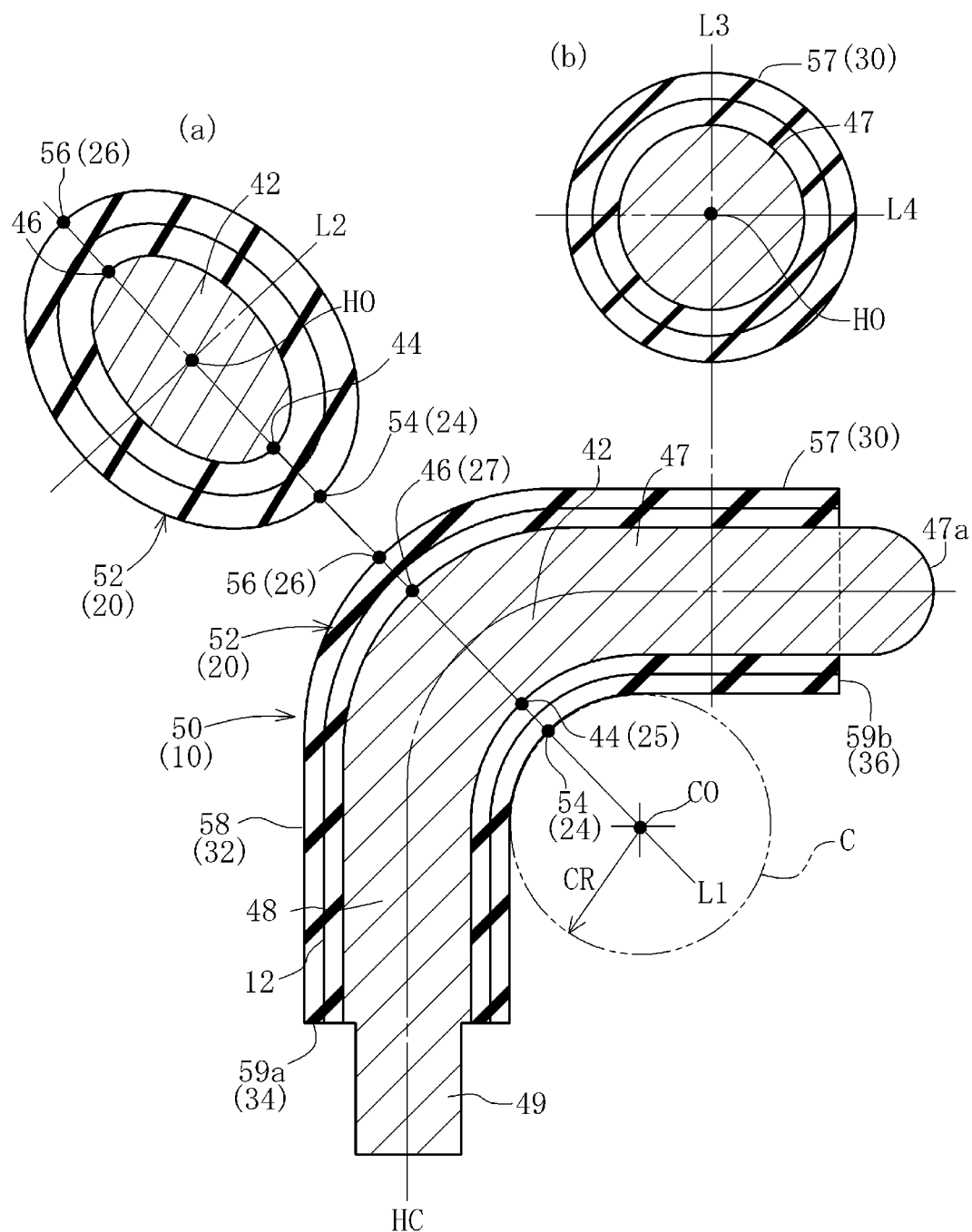
FIG. 7 is a cross sectional view of an unvulcanized hose is fitted to a mandrel.

FIG. 7 shows a condition where the unvulcanized hose 50 is put on the mandrel 40. As shown in FIG. 7, one end portion 59a of the unvulcanized hose 50 is put on a tip 47a and forced forward, so that the mandrel 40 is inserted into the inside of the unvulcanized hose 40. Then, the unvulcanized hose 50 is bent along the mandrel bent portion 42, and an unvulcanized hose bent portion 52 is formed in an intermediate portion in the longitudinal direction of the unvulcanized hose 50. Both sides in the longitudinal direction of the unvulcanized hose bent portion 52 extend along the mandrel first straight portion 47 and the mandrel second straight portion 48 so as to form an unvulcanized hose first straight portion 57 and an unvulcanized hose second straight portion 58. The other end portion 59b which is an end portion of the unvulcanized hose first straight portion 57 is located in the vicinity of the tip 47a.

A transverse cross section of the unvulcanized hose bent portion 52, as shown in a rotational cross section (a), is formed in a vertically long elliptical shape. An unvulcanized hose inner round portion 54 and an unvulcanized hose outer round portion 56 each make tight contact with the mandrel inner round portion 44 and the mandrel outer round portion 46.

In particular, since the mandrel inner round portion 44 of the mandrel bent portion 42 protrudes in the direction of the round center CO, the unvulcanized hose inner round portion 54 is tightened by pressing the mandrel inner round portion 44 to come into tight contact with the mandrel inner round portion 44 firmly, and this tight contact is maintained.

A transverse cross section of the unvulcanized hose first straight portion 57, as shown in a rotational cross section (b), is formed in a perfect circular shape and comes into tight contact with an outer circumference of the mandrel first straight portion 47. Similarly, the unvulcanized hose second straight portion 58 is formed in a perfect circular shape and comes into tight contact with an outer circumference of the mandrel second straight portion 48.

In this condition, when the unvulcanized hose 50 is heated, the unvulcanized hose bent portion 52, the unvulcanized hose first straight portion 57 and the unvulcanized hose second straight portion 58 are vulcanized in a condition where they are in tight contact with the mandrel bent portion 4, the mandrel first straight portion 47 and the mandrel second straight portion 48, respectively. Thus, the unvulcanized hose bent portion 52 is molded into the bent portion 20 of the hose 10. The unvulcanized hose first straight portion 57 is molded into the first straight portion 30, and the unvulcanized hose second straight portion 58 is molded into the second straight portion 32.

Further, the unvulcanized hose inner round portion 54 and the unvulcanized hose outer round portion 56 are molded into the inner round portion 24 and the outer round portion 26, respectively. Moreover, a part of the unvulcanized hose 50 which contacts the mandrel inner round portion 44 is molded into the inner round 25, and a part of the unvulcanized hose 50 which contacts the mandrel outer round portion 46 is molded into the inner round 27. In addition, the one end portion 59a is molded into the starting end 34 and the other end portion 59b is molded into the terminal end 36. In the drawing, the reference characters of each part of the hose 20 corresponding to each part of the unvulcanized hose 50 are given in parentheses.

After being vulcanized, the inner circumferential round 25 of the bent portion inside 22 of the hose 20 is formed in a tight contact condition along the mandrel inner round portion 44, and the inner round portion 24 is formed with a predetermined small round (less than 2D, for example R40 or so). As a result, it is possible to obtain the hose 10 which does not have a poor appearance part, such as wrinkles or the like in the bent portion inside 22.

In addition, the inner circumferential round 27 of the bent portion outside 23 is formed along the mandrel round portion 46 of the mandrel bent portion 42, and the outer round portion 26 is formed with a predetermined round.

Further, since the circumferential length of the outer circumference of the mandrel 40 over the whole length in the longitudinal direction of the mandrel is identical with L, the circumferential length of the inner circumference of the hose 10 is identical with L, so that the inner circumferential length of each of the bent portion 20, the first straight portion 30 and the second straight portion 32 is L.

Figure 16A:
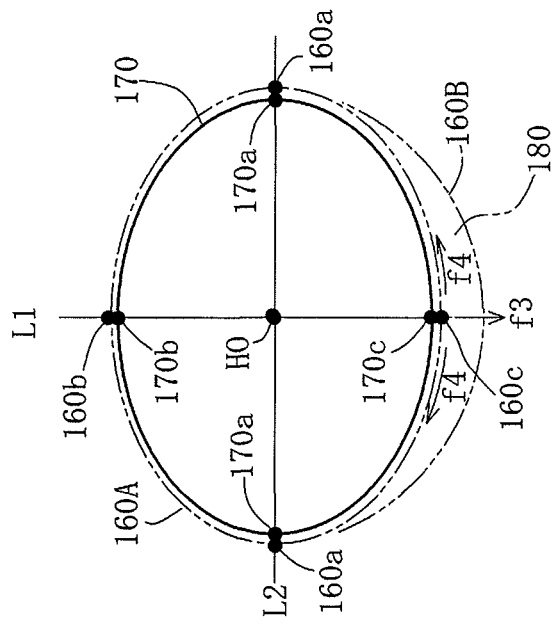
FIGS. 16(A) and 16(B) illustrate fundamentals of molding for forming the bent portion in the related art example.
Figure 16B:
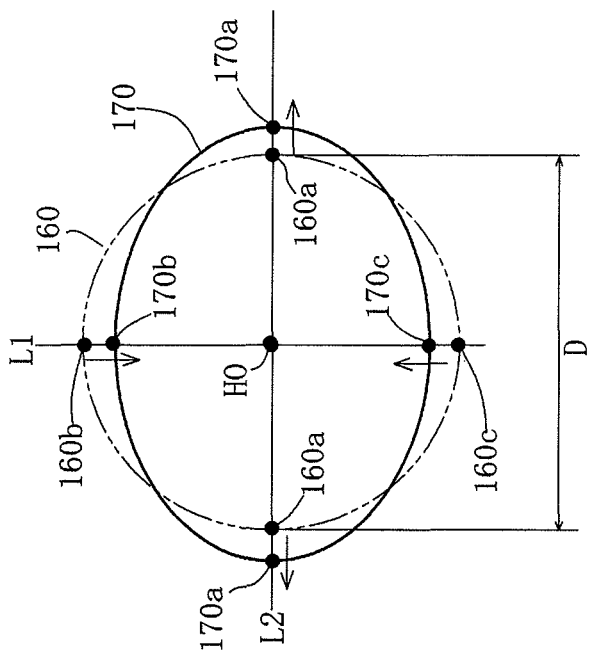

Next, the fundamentals of molding for forming the bent portion will be explained with reference to FIG. 8. In this diagram, similarly to FIG. 16(A), a bent portion inner circumferential configuration 70 is placed on a reference inner circumferential circle 60.

The reference inner circumferential circle 60 shows the outer circumference of perfect circular shape in cross section of each of the mandrel first straight portion 47 and the mandrel second straight portion 48 and has a radius r.

The bent portion inner circumferential configuration 70 schematically shows the outer circumference in cross section in the round radius direction of the mandrel bent portion 42 which has a vertically long non-circular shape consisting of an elliptical shape, and is formed in a vertically long elliptical shape which has a long radius a extending along the center line L1 in the vertical direction and a short radius b extending along the center line L2 in the horizontal direction. The circumferential lengths of the reference inner circumferential circle 60 and the bent portion inner circumferential configuration 70 are shown as (L) and are identical with each other.

When intersecting points between the bent portion inner circumferential configuration 70 and the vertical center line L1 are designated as an inward projection 72 and an outward projection 74, and intersecting points between the reference inner circumferential circle 60 and the vertical center line L1 are designated as an inner end portion 44a and an outer end portion 46a, the inward projection 72 projects inwardly from the inner end portion 44a of the reference inner circumferential circle 60 (a projecting amount=d). Moreover, the outward projection 74 project outwardly from the outer end portion 46a of the reference inner circumferential circle 60 by d.

Each of the inward projection 72 and the outward projection 74 has a length corresponding to the long radius a from the hose center HO. Since the inward projection 72 is a point located on the mandrel inner round portion 44 and overlaps with the unvulcanized hose inner round portion 54, a reference character (54) is given in the drawing. Similarly, since the outward projection 74 is a point located on the mandrel outer round portion 46 and overlaps with the unvulcanized hose outer round portion 56, a reference character (54) is given in the drawing.

When putting the unvulcanized hose 50 on the mandrel 40, the unvulcanized hose bent portion 52 is deformed so as to become the same shape as the bent portion inner circumferential configuration 70. At that time, due to the inward projection 72 and the outward projection 74, the unvulcanized hose inner round portion 54 and the unvulcanized hose outer round portion 56 are extruded inwardly and outwardly by the length d from the inner end portion 44a and the outer end portion 46a of the reference inner circumferential circle 60, respectively. Therefore, the unvulcanized hose inner round portion 54 and the unvulcanized hose outer round portion 56 each are brought into tight contact with the mandrel inner round portion 44 and the mandrel outer round portion 46 firmly.

In this condition, since the unvulcanized hose inner round portion 54 is extruded inwardly (In the direction of the round center CO) and pulled actively by the mandrel round portion 44 which projects inwardly of the mandrel, it is pressed firmly against the mandrel inner round portion 44 due to its elasticity so as to maintain the tight contact state, so that it is not separated from the mandrel inner round portion 44 even by the restoring force of the unvulcanized hose inner round portion 54.

Figure 15:
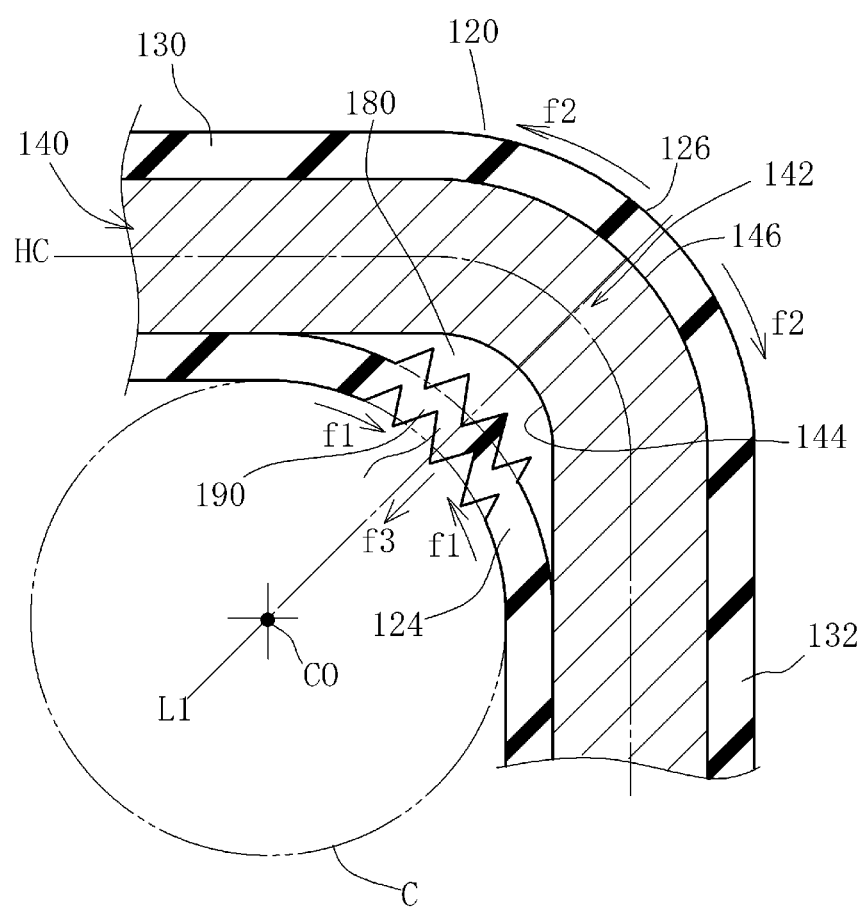
FIG. 15 is a cross sectional view illustrating a manufacturing method of the hose in the related art example.

Accordingly, since a space (see the reference character 180 of FIG. 15) is not formed between the unvulcanized hose round portion 54 and the mandrel inner round portion 44, buckling deformation or the like does not occur in the unvulcanized hose round portion 54. In addition, since the unvulcanized hose is vulcanized in this tight contact state, the poor appearance part is not created.

In addition, since this tight contact state is maintained even if the round of the mandrel inner round portion 44 is small, a small round (less than twice of the inner diameter D) which is smaller than 2D of the limits in the past, that is, such a small round as R40 in the case of D=30 mm can be realized.

Further, since the unvulcanized hose outer round portion 56 is brought into tight contact with the mandrel outer round portion 46 in substance by tension of a material itself at the time of fitting even if there is not provided a protruding portion such as the outward projection 74, it is a part in which the wrinkles or the like is hardly created. However, when the mandrel outer round portion 46 is protruded outwardly as much as the length d, the unvulcanized hose outer round portion 56 makes tight contact with the mandrel outer round portion 46 more firmly, whereby the creation of the wrinkles or the like is prevented more accurately.

Further, since the reference inner circumferential circle 60 and the bent portion inner circumferential configuration 70 are the same in circumferential length, left and right parts of the bent portion inner circumferential configuration 70 located on intersecting points with the horizontal center line L2 are pulled in the direction of the center HO when the unvulcanized hose inner round portion 54 and the unvulcanized hose outer round portion 56 are extruded inwardly and outwardly and extended in the vertical direction. Therefore, since lateral surfaces of the unvulcanized hose bent portion 52 come into tight contact with the intersecting points between the bent portion inner circumferential configuration 70 and the horizontal center line L2 and with lateral surfaces of the mandrel bent portion 42 located in the vicinity of the intersecting points, the creation of the wrinkles or the like is prevented also in the lateral surfaces of the hose bent portion 20.

According to the hose and the manufacturing method thereof in this embodiment, it is possible to realize the small round (less than twice of the inner diameter D, which was the past limit) while suppressing the creation of the poor appearance part. Therefore, the hose can be arranged compactly within the engine room, and the engine room can be compactified while making it possible to simplify a layout of the radiator and surrounding component members. In particular, when such small round as R40 in the case of D-30 mm is realized, the engine room can be compactified as much as possible.

Further, since the cross sectional shape in the round radius direction of the bent portion 20 is the vertically long elliptical shape or other vertically long non circular shape, the bent portion 20 can be formed in various vertically long non-circular shapes while taking the surrounding component members or the like into consideration, whereby the degree of freedom in designing the cross sectional shape of the bent portion 20 is increased.

Further, with respect to the cross sectional shape of the hose 10, the first straight portion 30 and the second straight portion 32 forming non-circular portions are formed in a perfect circular shape. The first straight portion 30 of perfect circular shape in cross section, the bent portion 20 of vertically long elliptical shape in cross section and the second straight portion 32 of perfect circular shape in cross section are continuously connected in that order in the longitudinal direction while varying in shape. Therefore, since only the transverse cross section of the bent portion 20 is formed in a vertically long flat shape, and other portions are formed in a simple perfect circular shape, the whole can be formed in a simple shape.

Further, since each of the inner circumferential lengths of the bent portion 20, the first straight portion 30 and the second straight portion 32 is identical with L, they do not become partially thin even if the bent portion 20 is pulled inwardly and outwardly, so that the thickness is maintained uniform over the whole length in the longitudinal direction. Therefore, the bent portion 20 does not decrease in strength, thereby increasing the durability thereof.

Further, since the cross section in the round radius direction of the bent portion 20 is formed in a vertically long elliptical shape as a vertically long flat shape, the circumferential length can be maintained uniform without increase in circumferential length in the longitudinal direction. Therefore, the creation of the poor appearance part can be suppressed, and the durability can be improved. Moreover, since the circumferential length including that of the bent portion 20 is constant in the longitudinal direction, the insertion and fitting between the mandrel and the hose each having a bent shape can be easily done, whereby it is possible to improve workability. In addition, the variation in passage cross section area in the bent portion 20 is suppressed, thereby obtaining the hose which is suitable for use as the hose for high pressure fluid and the like.

Referring to the hose disclosed in the Patent Reference 1, in the case where the bent portion is formed in a horizontally long flat shape and the circumferential length of the inner circumference is gradually increased in the longitudinal direction, the diameter of the unvulcanized hose is gradually increased in the longitudinal direction, so that the thickness varies in the longitudinal direction and durability is easily deteriorated. Therefore, even if the bent portion is formed with a small round to some extent while suppressing the creation of the poor appearance part, the durability may be deteriorated. In addition, since the passage cross section area varies in the longitudinal direction, the changes in fluid speed and pressure are developed, thereby the hose may not be suitable for use as a fluid hose.

Figure 8:
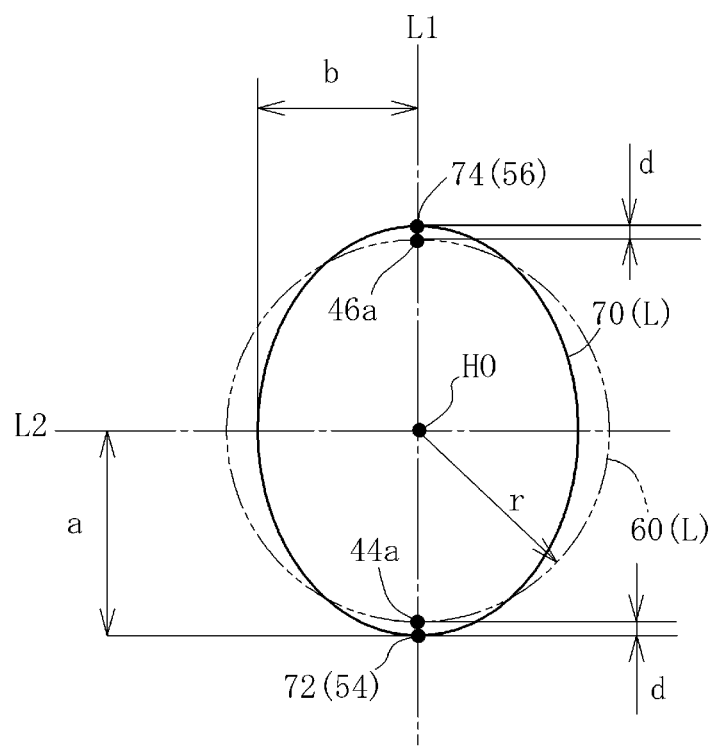
FIG. 8 is a diagram explaining fundamentals of molding for forming a bent portion.
Figure 9:
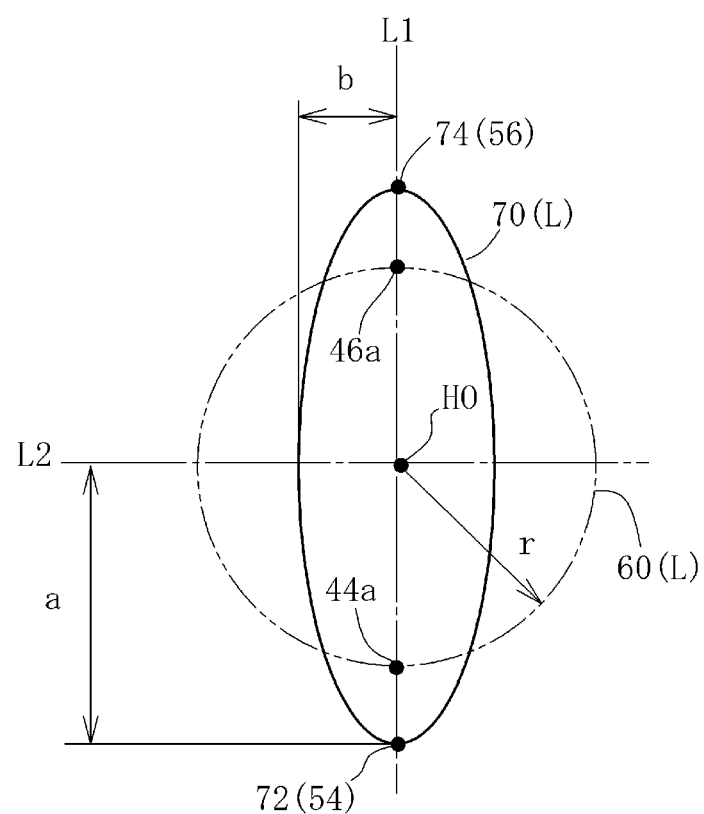
FIG. 9 is a view showing a modified form of the bent portion.

FIG. 9 is a view showing a modified example in a manner similar to that of FIG. 8, in which a flattening rate is slightly changed. The flattening rate is increased by making the long radius a larger and the short radius b smaller. With this configuration, it is possible to obtain the similar effects of the vertically long elliptical shape. The extrusion by the mandrel inner round portion 44 is increased at the time of vulcanization, so that the inner round portion 24 is brought into tight contact with the mandrel inner round portion 44 more firmly. Therefore, it is possible to make the inner round portion 24 smaller in round size.

As the circumferential length is identical, the flattening rate can be set freely. When the flattening rate is large, the thickness in the left and right direction can be thinned. Therefore, an arrangement space in the left and right direction can be easily ensured in mutual relationship with the surrounding component members, whereby it is possible to increase the degree of freedom in layout.

Figure 10:
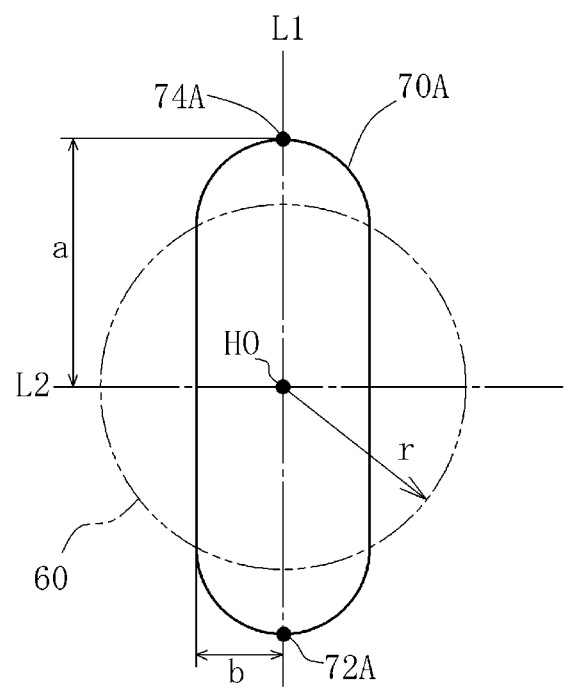
FIG. 10 is a view showing a shape of the bent portion in accordance with a second embodiment.

Further, FIGS. 9 and 10 show examples which are formed symmetric both in the left and right direction of the vertical center line L1 (the left and right direction of the drawing) and in the inward and outward direction of the horizontal center line L2 (the upward and downward direction of the drawing). This configuration also applies to FIG. 12.

In addition, it is possible to employ various vertically long flat shapes of non-circle in the cross section in the round radius direction of the bent portion 20. Hereunder, this will be explained by an inner circumferential shape of the bent portion. In the following examples, the reference inner circumferential circle 60, the vertical center line L1 and the horizontal center line L2 are identical with those of FIGS. 8 and 9.

FIG. 10 is a second embodiment showing an example in which the bent portion inner circumferential configuration replaces the bent portion inner circumferential configuration 70 with a vertically long oblong configuration 70A. A reference character a designates a length between the center H0 and each of an inward projection 72A and an outward projection 74A on the vertical center line L1, and b designates a length from the center H0 to each of left and right sides on the horizontal center line L2. These lengths correspond to the long radius a and the short radius b of the bent portion inner circumferential configuration 70, with the length a>the length b.

With this configuration, as the length a is larger than the radius r of the reference inner circumferential circle 60, similar effects (such as suppression of creation of wrinkles or the like) can be expected. In addition, by employing the vertically long oblong configuration, the length a can be easily made longer. Moreover, since the bent portion outer circumference of the mandrel corresponds to the vertically long oblong configuration 70A, and the inner circumference of the unvulcanized hose corresponds to the reference inner circumferential circle 60, a contact region is decreased when the unvulcanized hose is fitted onto the mandrel, so that the resistance is decreased, thereby making it possible to improve workability.

The bent portion 20 and portions other than the bent portion have the same circumferential length (this applies to each example to be referred to below). The condition of a>r is sufficient if it is satisfied at least on the inward projection 72 side.

Figure 11A:
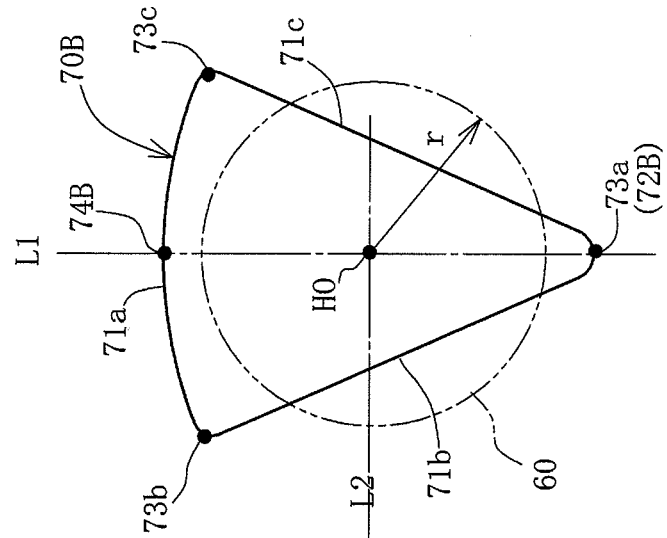
FIGS. 11(A) and 11(B) illustrate a shape of the bent portion in accordance with a third embodiment.

FIG. 11 is a third embodiment showing an example in which the bent portion inner circumferential configuration is a triangle. FIG. 11(A) is an example in which a bent portion inner circumferential configuration 70B is formed in an inverted triangle consisting of an isosceles triangle which has three sides (71a, 71b, 71c) and three apexes (73a, 73b, 73c). One apex 73a projects inwardly (downwardly in the drawing) from the center HO on the vertical center line L1, and other two apexes 73b, 73c are spaced apart from the vertical center line L1 in the left right directions and arranged above the center HO on the outside of the reference inner circumferential circle 60. Each of the apexes is located on the outside of the reference inner circumferential circle 60. The apex 73a forms an inward projection 72B. Outer projections 74B are formed of the apexes 73b, 73c which form both ends of a horizontal base 71a. With this configuration, the contact with the unvulcanized hose 50 is made at three points consisting of the three apexes (73a, 73b, 73c), whereby the fitting operation can be performed easily.

Figure 11B:
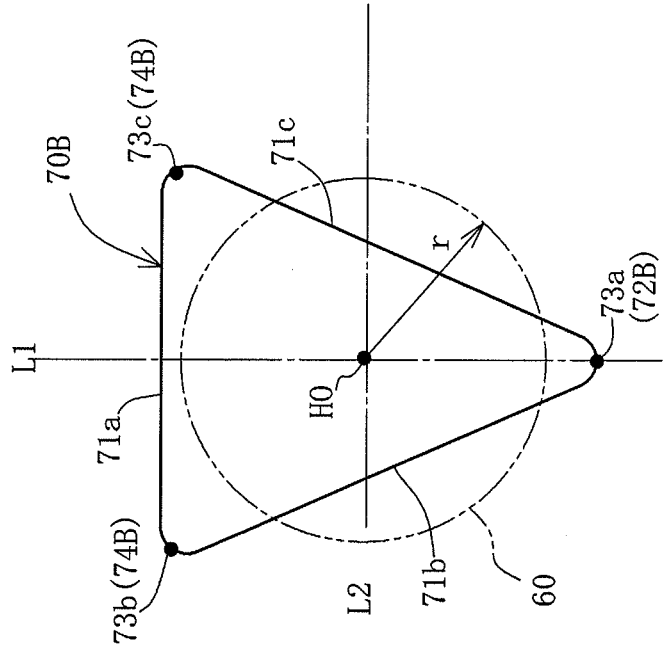

FIG. 11(B) shows an example in which a bent portion inner circumferential configuration 70B is formed in an inverted triangle similar to FIG. 11(A), and a base 71a is formed in a round shape. In this example, since an outward projection 74B is located in a middle portion of the base 71a, the whole base 71a is able to make contact with a part corresponding to the unvulcanized hose outer round portion 56 (see FIG. 7), so that it is possible to suppress the local deformation of the unvulcanized hose outer round portion 56 which is subjected to strong pulling force.

The examples in FIG. 11 are formed asymmetric in the inward and outward directions (the vertical direction) with respect to the horizontal center line L2 and symmetric in the left and right directions of the vertical center line L1.

When a cross section in the round radius direction of the bent portion is formed asymmetric in the vertical direction, the deformation region such as a clearance with respect to the surrounding component members or the like can be provided, whereby the degree of freedom in designing the cross sectional shape of the bent portion is improved.

Figure 12A:
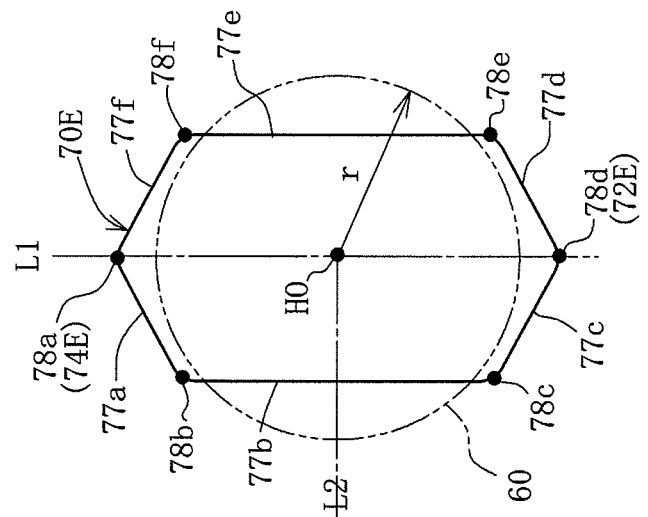
FIGS. 12(A), 12(B), and 12(C) illustrate a shape of the bent portion in accordance with a fourth embodiment.
Figure 12B:
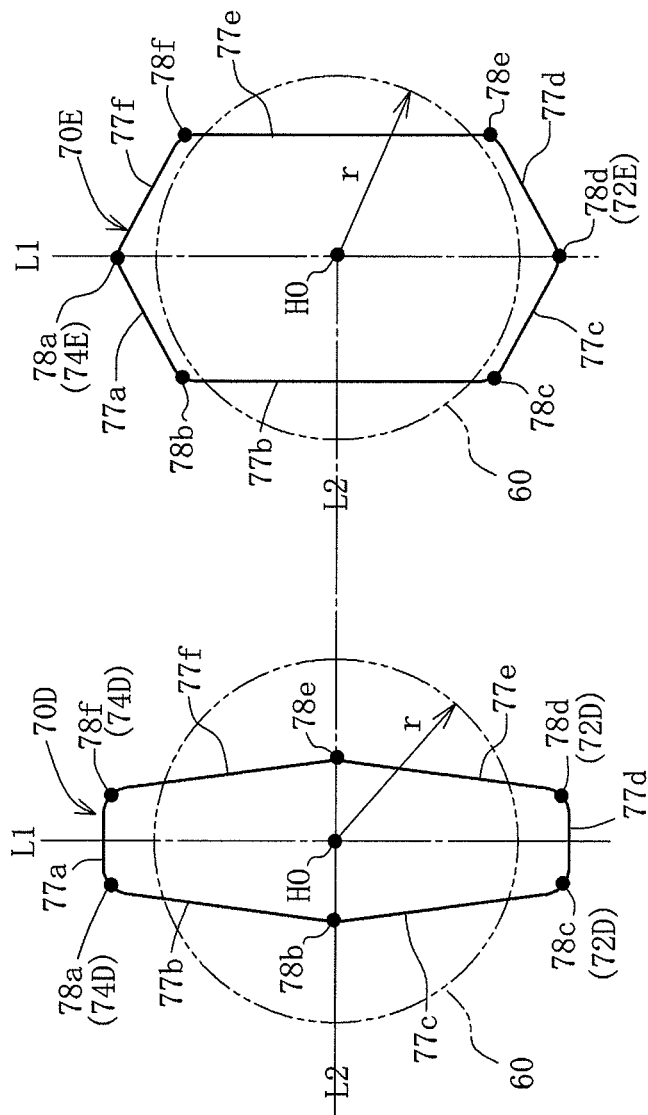

FIG. 12 is a fourth embodiment showing examples in which the bent portion inner circumferential configuration is formed in a polygon equal to or more than a tetragon. FIG. 12 (A) shows an example having a bent portion inner circumferential configuration 70C of vertically long substantially rectangular shape. The bent portion inner circumferential configuration 70C has four sides (75a, 75b, 75c, 75d) and four apexes (75e, 75f, 75g, 75h). The upper side 75a and the lower side 75c extend horizontally, and the left and right sides 75b and 75d are arranged in the upward and downward direction of the drawing respectively and extend in parallel with each other.

Inner projections 72C are formed as the left and right apexes 75f, 75g on the lower side 75a, and outer projections 74C are formed as the left and right apexes 75e, 75h on the upper side 75a.

With this configuration, the contact with the unvulcanized hose 50 can be made at four points, whereby a contacting region with the unvulcanized hose can be reduced. Herein, in the case where the bent portion inner circumferential configuration 70C is formed in a tetragon, it is not limited to a rectangle and it may be formed in an inverted trapezoid which has the shorter lower side 75c than the upper side 75a.

FIG. 12 (B) is an example having a bent portion inner circumferential configuration 70D of hexagon which has six sides (77a, 77b, 77c, 77d, 77e, 77f) and six apexes (78a, 78b, 78c, 78d, 78e, 78f). Short upper side 77a and lower side 77d are arranged horizontally. A pair of opposed left and right long sides 77b, and 77f extends downwardly and is inclined in an outwardly opening fashion on the upper side of the center HO. A pair of opposed left and right long sides 77c and 77e extends upwardly and is inclined in an outwardly opening fashion on the lower side of the center HO. The apex 78b at which the sides 77b and 77c are connected to each other and the apex 78e at which the sides 77f and 77e are connected to each other are arranged on the left and right sides of the vertical center line L1 on the horizontal center line L1, respectively.

With this configuration, the contact with the unvulcanized hose 50 can be made at six points. Moreover, an essential part for molding the bent portion can be supported at four points on an inward projection 72D comprised of relatively adjacent two apexes 78c and 78d and on an outward projection 74D comprised of relatively adjacent two apexes 78a and 78f in a similar way.

Figure 12C:
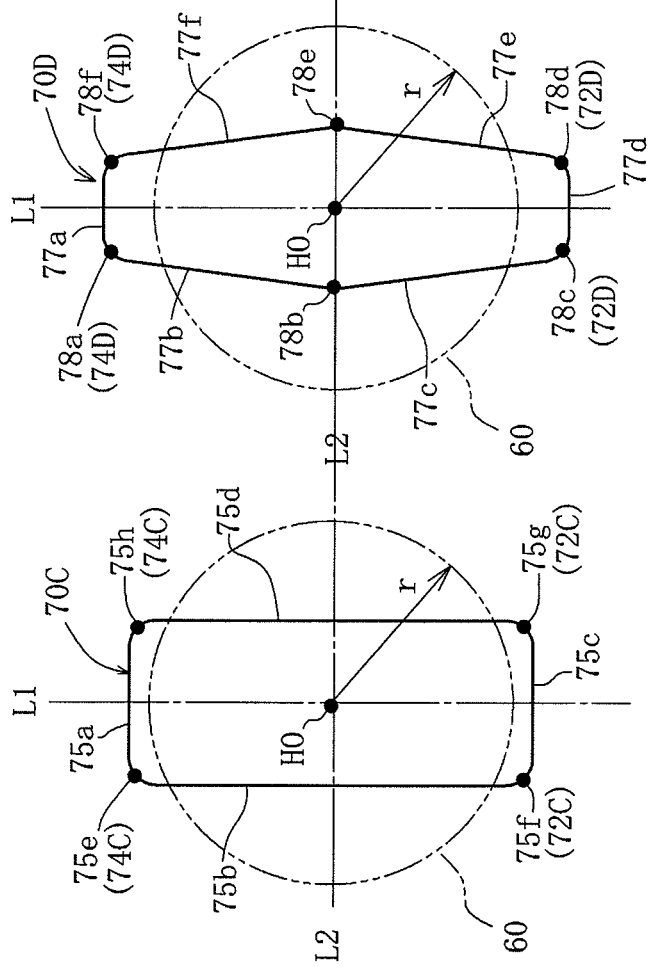

FIG. 12(C) is an example having a bent portion inner circumferential configuration 70E of hexagon similar to the bent portion inner circumferential configuration 70D. However, all of the apexes are located outwardly of the reference inner circumferential circle 60. An inward projection 72E is comprised of one apex 78d, and an outward projection 74E is comprised of opposed one apex 78a. In addition, upper sides 77a, 77f and lower sides 77c, 77d are inclined, respectively.

With this configuration, the contact with the unvulcanized hose 50 is made at six points by each of the six apexes. However, since an essential part for molding the bent portion are formed with the inward projection 72E comprised of one apex 78d and the outward projection 74E comprised of similar one apex 78a, the projection in the round radius direction is increased, thereby reducing the creation of the wrinkles or the like.

The bent portion inner circumferential configuration of polygon is not limited to the above referred examples. A pentagon, a heptagon or more polygonal shape may be employed.

Figure 13:
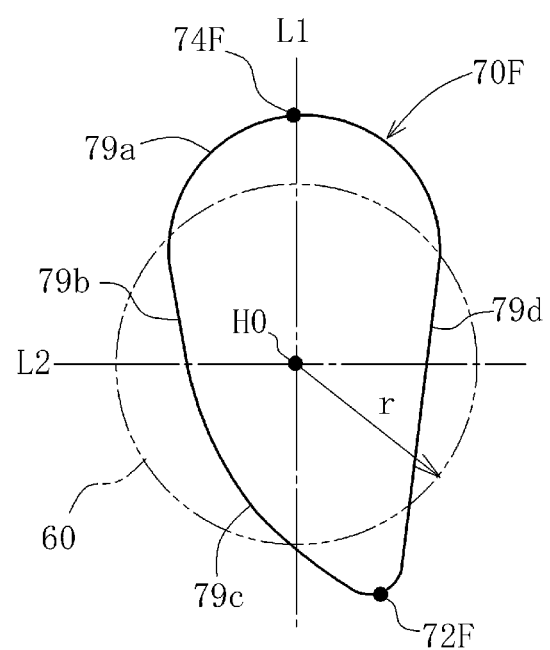
FIG. 13 is a view showing a shape of the bent portion in accordance with a fifth embodiment.
Figure 14:
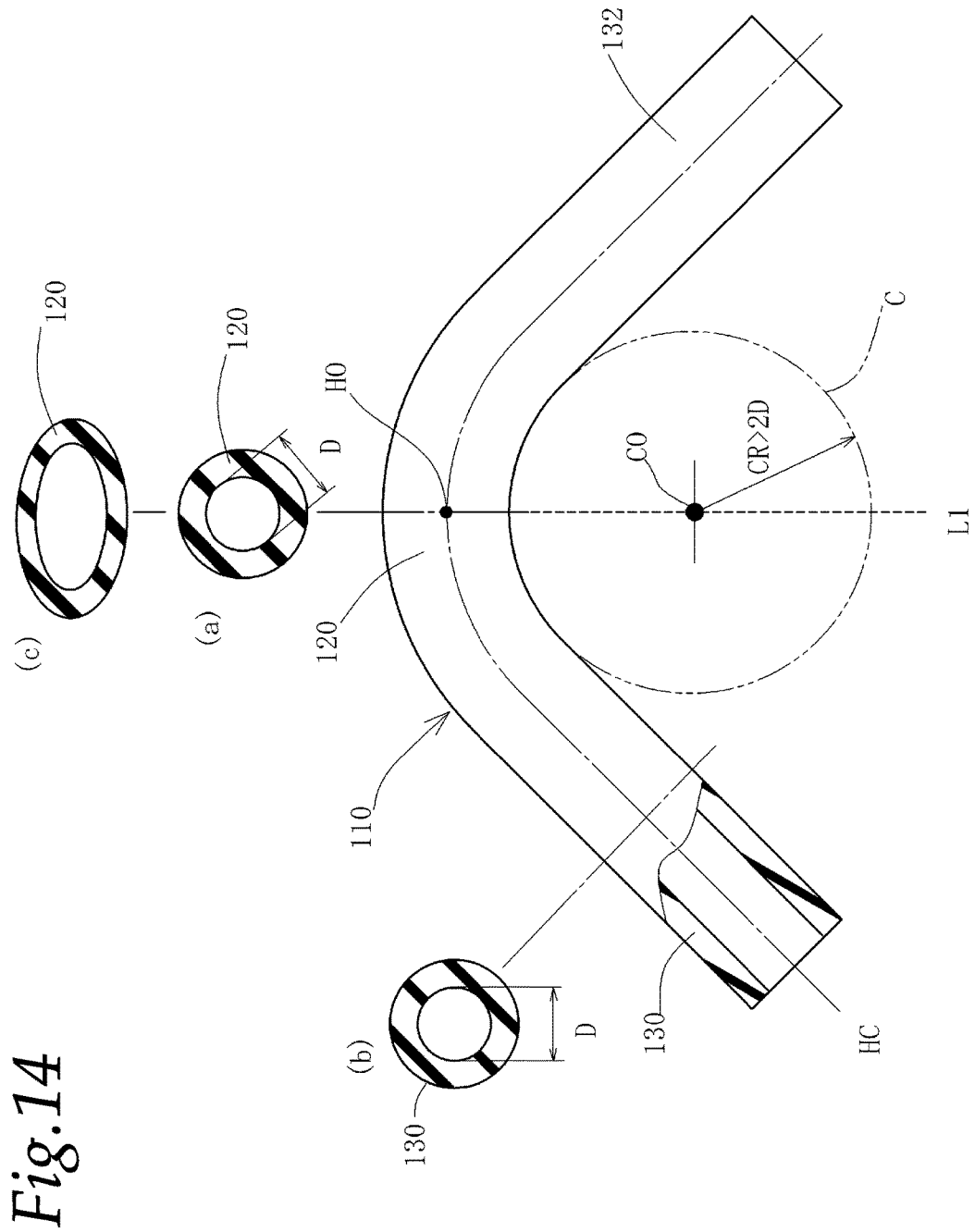
FIG. 14 is a plan view of the hose in the related art example.

FIG. 13 is a fifth embodiment showing an example in which a bent portion inner circumferential configuration 70F has a vertically long non-circular shape which is asymmetric and indeterminate both in the upward and downward direction and in the left and right direction of the drawing.

In this example, an inward projection 72F extends downwardly of the reference inner circumferential circle 60. An outward projection 74F is an apex portion of a circular arc-shaped part 79a. A left side portion which connects the circular arc-shaped part and the inward projection 72F is comprised of a straight line part 79b and a round part 79c, and a right side portion is comprised of a straight line part 79d.

The inward projection 72F and the outward projection 74F are arranged asymmetric in the upward and downward direction of the drawing and are shifted from each other in the left and right directions.

With this configuration, the creation of the wrinkles or the like can be prevented by the inward projection 72F. However, it is preferable that the inward projection 72F approaches as close to the vertical center line L1 in the radial direction of the round circle as possible. In addition, although the bent portion inner circumferential configuration 70F is able to be formed in any indeterminate shape, it is preferable that a shape of each of the left side (79b, 79c), the right side (79d) and the circular arc-shaped part 79a is a straight line shape or a curved shape which is convexed outwardly in the radial direction of the reference inner circumferential circle 60 so as not to be concaved inwardly in the radial direction.

Further, since a cross sectional shape in the round radius direction is asymmetric in the horizontal direction, lateral surfaces of the bent portion are changed in shape so as to make it possible to provide a clearance or the like with respect to the surrounding component members, so that the degree of freedom in designing the cross sectional shape of the bent portion is improved. If it is asymmetric in each of vertical direction and the horizontal direction, the degree of freedom is increased further.

The cross sectional shape of the bent portion in the present application is sufficient if it is formed in a vertically long non-circular shape. As the vertically long non-circular shape, an elliptical circle (FIGS. 8 and 9), an oblong circle (FIG. 10), a polygonal shape (FIGS. 11 and 12) and an indeterminate shape as shown in FIG. 13 may be employed. In addition, the bent portion is sufficient if at least an inside part projects in the round radius direction like the inward projection 72 of FIG. 8, a length from the center HO is longer than the radius r of the reference inner circumferential circle 60 and there is a part which protrudes inwardly by d from the reference inner circumferential circle 60. Therefore, various shapes may be employed other than the above described embodiments. The outward projection 74 (74A, 74B, 74C, 74D, 74E, 74F) may be located in the reference inner circumferential circle 60.

In addition, the cross sectional shapes in the first straight portion 30 and the second straight portion 32 are not limited to a perfect circle, and various non-circular shapes may be employed.

Further, the bent pipe includes a hose and tubular members such as a thinner tube or the like, and the range of its use is not limited to the radiator hose, but is applicable to various fluid pipes or tubes.

DESCRIPTION OF REFERENCE CHARACTERS

10 Hose, 20: Bent portion, 22: Inside part, 23: Outside part, 24: Inner round portion, 30: Straight portion, 40: Mandrel, 42: Bent portion, 44: Inner round portion, 46: Outer round portion, 50: Unvulcanized hose, 52: Bent portion, 54: Inner round portion, 56: Outer round portion, 60: Reference inner circumferential circle, 70: Ellipse (Bent portion inner circumferential configuration), 180: Space, 190: Poor appearance part

What is claimed is:

1. A bent pipe comprising:
   a bent portion located in an intermediate part in a longitudinal direction in which a cross section in a radial direction of a round of the bent portion is formed in a flat shape; and
   non-bent portions continuous with the bent portion;
   wherein the flat shape of the bent portion has a vertically long flat shape, and, in a transverse cross section of the bent pipe, a circumferential length of the bent portion is equal to a circumferential length of the non-bent portions; and,
   wherein the bent portion and non-bent portions are formed from a rubber material.

2. The bent pipe according to claim 1, wherein the bent pipe comprises first and second non-bent portions and transverse cross sections of the non-bent portions are formed in a perfect circle shape, and the bent pipe is formed continuously from the first non-bent portion, through the bent portion, to the second non-bent portion in the longitudinal direction, and wherein the bent portion is bent at a predetermined curvature of the round, and the bent pipe varies in transverse cross section gradually at a round stop thereof from a perfect circle to a circumferentially long flat shape or from a circumferentially long flat shape to a perfect circle while keeping a circumferential length constant.

3. The bent pipe according to claim 1, wherein the bent portion has a cross section of a vertically long elliptical shape or a vertically long non-circular shape.

4. The bent pipe according to claim 1, wherein a cross sectional shape in the radial direction of the round of the bent portion is asymmetric in a vertical direction.

5. The bent pipe according to claim 1, wherein a cross sectional shape in the radial direction of the round of the bent portion is asymmetric in a horizontal direction.

6. The bent pipe according to claim 1, wherein each of the non-bent portions has a cross sectional part of perfect circle shape, and an inner round of the bent portion is less than twice an inner diameter D of the cross sectional part of perfect circle shape.

\* \* \* \* \*